Oct. 20, 1959 E. LIFFERTH 2,909,598
PRODUCING PRINTING PLATES WITH SELECTIVELY VARIABLE REPRODUCTION SCALE
Filed July 3, 1956
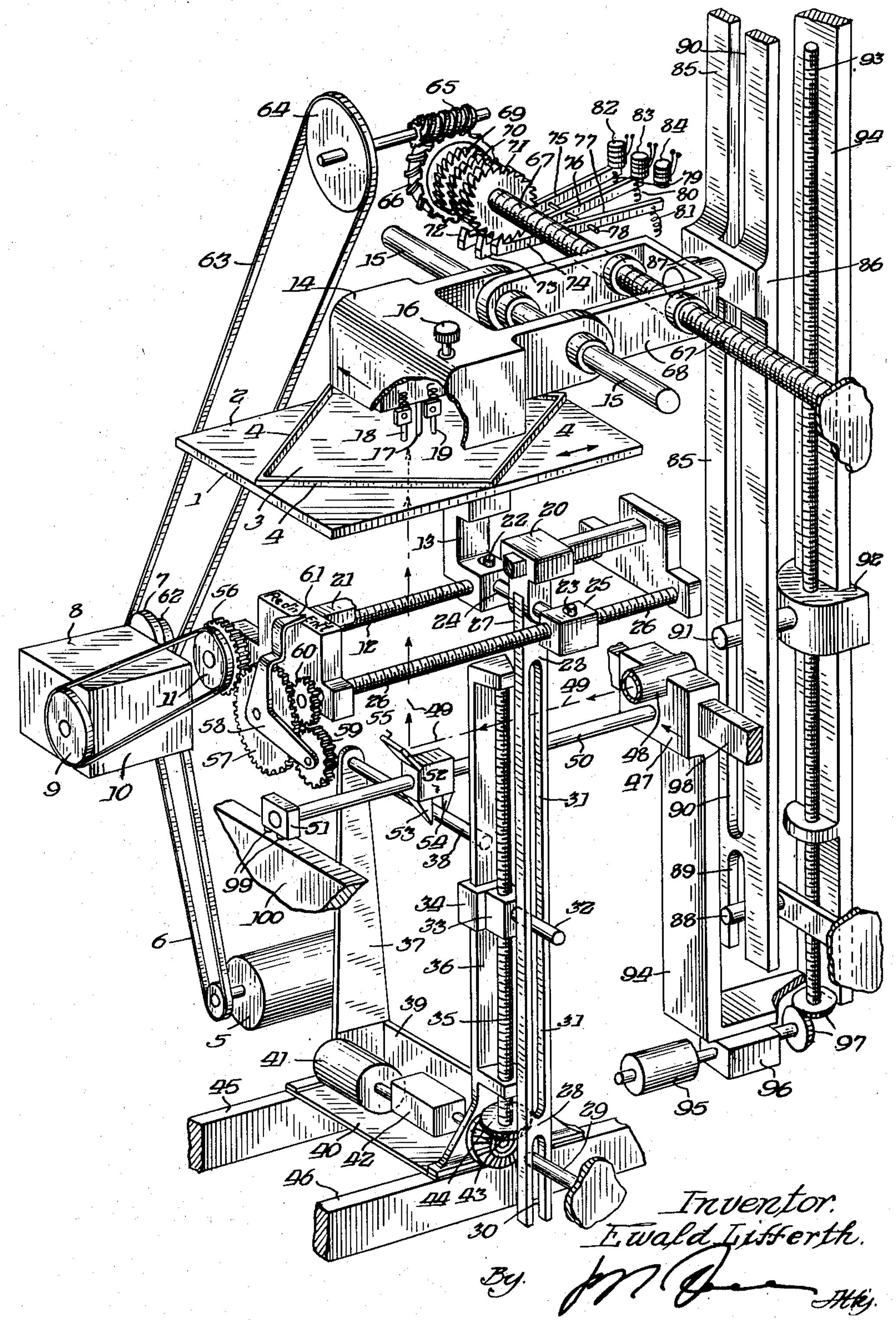
Inventor.
Ewald Lifferth.
By. Atty.

United States Patent Office 2,909,598

Patented Oct. 20, 1959

2,909,598

PRODUCING PRINTING PLATES WITH SELECTIVELY VARIABLE REPRODUCTION SCALE

Ewald Lifferth, Kiel, Germany, assignor to Dr. Ing. Rudolf Hell Kommanditgesellschaft, Kiel-Dietrichschof, Germany, a corporation of Germany Application July 3, 1956, Serial No. 595,695

Claims priority, application Germany July 5, 1955

6 Claims. (Cl. 178—6.6)

This invention is concerned with apparatus for electromechanically producing screened printing plates with selectively variable reproduction scale.

Methods of and apparatus for electromechanically producing screened or unscreened printing plates have become known, in which the ratio of the size of the printing plate to the size of the copy or picture to be reproduced could be adjustably varied.

A known apparatus makes use of two tables disposed side by side, one table carrying the picture to be reproduced, which is photoelectrically scanned in two coordinate directions, and the other table carrying the plate which is to be simultaneously engraved in accordance with the picture content, by an engraving device operating in two coordinate directions. Either the scanning and engraving devices may be stationary and the two tables may reciprocate, or else the tables may be stationary and the engraving and scanning devices may execute reciprocating motions. The ratio between scanning speed and engraving speed and the ratio between the advance speeds perpendicular to the scanning and engraving device, respectively, are in such machines adjusted by gear or lever mechanisms according to the desired enlargement or reduction, respectively.

Methods and apparatus have also become known in which the two members, namely, the picture to be reproduced and the plate to be engraved according to the picture contents are disposed upon rotating drums respectively provided therefor, both drums either executing axial motions with the scanning and engraving devices in stationary positions or with both drums stationary while the scanning and engraving devices are moved relative to the circumference of the corresponding drums. The desired enlargement or reduction of the printing plate image as compared with the picture to be reproduced is in such machines obtained either by selectively using for one member drums of different diameter but having a speed of rotation identical with that of the drum carrying the other member, or by the use of drums with identical diameter but rotating at different speeds.

The present invention is applied to prior apparatus employing a single table to one side of which is fastened the picture to be reproduced and to the other side of which is fastened the plate to be correspondingly engraved. The table executes an oscillating or reciprocating motion, the picture on one side thereof being photoelectrically scanned during the motion of the table in one direction while the plate on the other side of the table is simultaneously engraved in accordance with the picture content. Prior apparatus of this type is illustrated in Patent No. 2,863,000, issued on December 8, 1958 to R. Hell and has the advantage of saving space and the further advantage of engraving on the plate a mirror image of the picture to be reproduced. The scanning and engraving devices are in such apparatus stationary.

The alteration of the reproduction scale is in accordance with the invention obtained by subjecting either the engraving device or the scanning device or both to auxiliary reciprocating motion relative to the reciprocating engraving table and adjusting the magnitude and direction of motion of the scanning and/or engraving device in accordance with the desired reproduction scale. In practice, the engraving device is suitably arranged stationary and only the scanning device is caused to execute the auxiliary motion.

Assuming the engraving device and also the scanning device to be stationary the reproduction scale will be 1:1. If the speed of the engraving table relative to the stationary negraving element is $u$ and if the scanning device is caused to move in the same direction as the engraving table and relative to the engraving element or tool with a speed $v<u$, the relative motion of the scanning device with respect to the engraving table will be $u-v<u$; that is, when the distance $u$ is in a time unit engraved on the plate member, the shorter distance $u-v$ will be scanned on the picture during the same time unit. The reproduction of the picture on the printing plate is accordingly enlarged as compared with the picture image.

If $v=u$, the enlargement will be infinite. If $v>u$, there will result $u-v<0$, that is, the engraving tool will pass the table with a relative motion $v-u$. There will be negative enlargement, which means that the plate and picture are not respectively engraved and scanned in the same directions, but in opposite directions. The printing plate will not be a mirror image of the picture to be reproduced; they will be sidereal. The print produced with the corresponding engraved plate will therefore be a mirror image of the picture. The operation according to $v>u$ is undesired and will not be employed in practice.

If the scanning device or element moves with the speed $v$ in a direction opposite to the direction of motion of the table, the relative speed thereof with respect to the table will equal $u+v>u$. Accordingly, the distance $u+v$ will be scanned in a time unit on the picture to be reproduced, while the distance $u$ will be engraved on the plate. The plate image is accordingly reduced as compared with the picture image.

It will be seen from the foregoing explanations that the image on the plate can be within wide limits enlarged or reduced, as compared with the picture image, by adjustment of the speed and direction of motion of the scanning element.

If the reproduction ratio, that is, the proportion of mutually corresponding linear increments of the plate and the picture is designated by $z$, such ratio will be equal to the ratio of the invariable relative speed $u$ of the engraving tool with respect to the engraving table, to the adjustable relative speed $u+v$ of the scanning element with regard to the table; thus $$z=\frac{u}{u\pm v}$$

If $v<0$ there will be enlargement; if $v=0$ there will be neither enlargement nor reduction; if $v>0$ there will be reduction.

The advance or shift motions of the engraving and scanning elements transverse of the table motions will depend upon the screening and the reproduction scale. The ratio between the two advance or shift steps must be equal to the reproduction ratio so that the scanning of the picture to be reproduced and the engraving of the corresponding printing plate can terminate at the same time. The advance step of the engraving tool after each line depends solely on the screen employed and is equal to the distance between two screen points in the engraving direction. The advance step of the scanning device depends on the other hand upon the screening used and also upon the reproduction scale.

If the screening number, that is, the number of engraving lines per unit of length or the engraving line density is $n$, the advance step of the engraving tool will equal $l/n$. With a reproduction ratio $z$, the scanning line density must then equal $nz$ or the advance step of the scanning element must equal $l/nz$. The total number of engraving lines is accordingly equal to the total number of scanning lines. With a given screen, the scanning line density will be upon enlargement greater and upon reduction smaller than the engraving line density.

The foregoing and other objects and features will appear from the description which will be rendered below with reference to the accompanying drawing showing an embodiment of the invention to give an example.

Referring now to the drawing, numeral 1 indicates the engraving table to the upper side 2 of which is suitably fastened the plate 3 to be engraved. Upon the underside of the table 1 is suitably fastened the picture to be reproduced (not visible in the drawing) which may be disposed in a suitable frame (likewise invisible). In the case of diagonal engraving, the picture and the plate are disposed with their edges extending diagonal to the edges of the table so that the preferred direction of the screening embraces with the plate edge an angle different from 0° and 90°.

A motor 5 is provided for rotating through the medium of belt 6 a pulley 7 to drive transfer gear means disposed in the gear box 8. The drive of the engraving table 1 is effected by means of pulley 9 and belt 10 for rotating wheel 11 fastened to screw 12 adapted to move an angular supporting nut 13 carrying the engraving table 1. The engraving table 1 executes a reciprocating motion in the scanning direction as indicated by the double headed arrow. If a cutting engraving tool is used which cuts shaving chips from the material of the plate 3, there will be scanning and engraving only during one motion of the table, for example, during the motion thereof from right to left. There will be no engraving during the return motion of the table, which may for time-saving be faster than the working motion, and the control current for the engraving tool will be disconnected so as to keep the cutting point of the tool spaced from the surface of the plate 3.

Numeral 14 indicates the engraving arm which is pivoted on a fixed rod 15. The engraving arm 14 can be tilted upwardly by means of a knob 16. Numeral 17 indicates the engraving tool or stylus. The cutting or engraving stroke of the stylus relative to the plate 3 is governed by an electromagnetic system (not shown) under control of photocell scanning of the picture to be reproduced. The stylus 17 moves in a periodic up and down motion effected by a screen frequency superimposed upon the control currents so as to produce upon the plate 3 a point screen. Spaced slightly respectively from the front and rear of the engraving stylus, as seen in the engraving direction, and depending from the engraving arm 14, are two switches 18 and 19 for controlling, responsive to engagement with the somewhat elevated edges of the frame 4 carrying the plate 3, the limitation of the table stroke and the return motion of the engraving table by means of the transfer gear 8. The stroke of the engraving table is thus continuously altered depending on the length of the engraving lines. The two switches 18 and 19 may for identical control operation be disposed underneath the table 1 for cooperation with the scanning system.

Numeral 20 indicates a cross head which is slidable on a bar 21. Numerals 22 and 23 indicate manually operable control members for shifting a clutch bolt 24 to the left or to the right (rearwardly and forwardly, as seen in the drawing), such that the cross head 20 can be moved along with the table supporting nut 13 or along with a nut 25 which is moved by a rotating screw 26. In the first case, the cross head 20 will execute the same motion as the table. Mounted pivotally on the clutch bolt 24 by the link 27 is a swinging arm 28. Responsive to motion of the cross head 20, this arm moves angularly about the fixed bolt 29 extending through the slot 30 at the lower end thereof. A second long slot 31 is formed in the arm 28 for sliding motion therein, of a bolt 32. The latter extends from a nut 33 extending from a member 34 which is slidable up or down along a bar 36 responsive to rotation of a screw 35 disposed in threaded engagement with the nut 33. The bar 36 is part of a frame comprising the member 37, held together by a rod 38, the rib 39 and the base plate 40. The parts 39 and 40 form a shelf on which are disposed a motor 41 and a transfer gear 42. The motor 41, by means of the transfer gear 42 and pinions 43 and 44, drives the screw 35 for the purpose of setting the bolt 32 in position on the bar 36. The frame comprising the parts 36 to 40 is slidably disposed upon rails 45 and 46.

Assuming horizontal displacement of the cross head 20, with constant speed, the arm 28 will move the slide bolt 32 and therewith the frame comprising the parts 36 to 40 likewise with constant speed, the speed of displacement of the frame depending thereby upon the position of the bolt 32 in the slot 31 of the arm 28, such position being continuously variable.

The optical scanning system (not visible in the drawing) is carried by a cylindrical part 48 fastened to the block-shaped member 47. The optical system comprises a light source, a condenser, which illuminates a small rectangular slot, a rotating perforated plate for periodically interrupting the scanning light beam, and optical means for projecting the fine light beam 49 to infinity. A rod 50 is fastened at one end on the member 47 and at its other end on a member 51, such rod carrying a support 52 movably disposed thereon. This support has fingers 53 and 54 embracing the frame bar 38 and is accordingly taken along and moved responsive to displacement of the frame. The support 52 carries a mirror 55 inclined at 45° which deflects the scanning light beam 49 vertically upwardly at 90° to the underside of the engraving table 1 to which is fastened the picture to be reproduced. The support 52 also carries two photocells (not visible) disposed close to the underside of the table 1 which receive the scanning light reflected diffused from the picture. The photoelectric currents generated by the photocells in accordance with the brightness of the scanned picture elements are amplified and control in known manner the cutting stroke of the engraving tool.

The image engraved upon the plate 3 will be respectively enlarged or reduced as compared with the picture image, depending upon whether the scanning light beam moves in the same direction or in a direction opposite to the motion of the table 1. The screw 26 serves to produce motion of the light beam in a direction opposite to the direction of motion of the table. The gear wheel 56 driven by the pulley 11 is always in mesh with a gear wheel 57. A gear wheel 59 is rotatably mounted on a crank bracket 58 and likewise always in mesh with gear wheel 57. A gear wheel 60 carried by the screw 26 is in mesh with the gear wheel 57. The crank bracket 58 is angularly adjustable and carries a pointer 61 which may be set respectively relative to markings "Reduction" and "Enlargement," and if the crank bracket is moved counter-clockwise with the pointer 61 moving to the left, in alignment with "Reduction," the gear wheel 59 will be put in mesh with the gear wheel 60 and the screw 26 will accordingly be rotated in a direction opposite to the direction of rotation of the screw 12. If the cross head 20 arranged on the clutch bolt 24 is moved by the members 22 and 23 to the right and connected with the nut 25, the scanning light beam will move in a direction opposite to that of the engraving table 1, and reduction will be effected. If the crank bracket 58 is moved clockwise, moving the pointer 61 to the right, into alignment with "Enlargement" the gear wheel 59 will disengage gear wheel 60, inhibiting rotation of the screw 26. If the cross head remains connected with the nut 25, the scanning light beam will stand still, that is, the reproduction ratio will be 1:1. If the cross head 20 is connected with the nut 13, the scanning light beam will move in the same direction as the table 1 and the image reproduced on the plate 3 will be enlarged as compared with the picture image.

Upon conclusion of the engraving of each line, the engraving arm 14 must be moved perpendicular to the engraving motion by the line spacing corresponding to the screen employed. The motor 5 drives through the belt 6 the pulleys 62 and 7 and through the belt 63 the pulley 64 and therewith the worm 65 and the worm gear 66. The latter drives the screw 67 through the medium of a suitable slip clutch (not shown) provided the slip clutch is not incapacitated by a locking device to be presently described. The screw 67 moves the engraving carriage 68 perpendicular to the engraving direction of motion of the table 1.

The advance or shift steps corresponding to the respectively employed screen are controlled by three rachets 69, 70, 71 which are fastened to the screw 67 and provided with respectively different number of teeth. In order to effect the advance motions there are provided stop pawls 72, 73, 74 carried respectively by stop levers 75, 76, 77 which are rotatably mounted on shaft 78 and biased in clockwise direction by springs 79, 80 and 81. Each stop lever is thus in normal position disposed with its pawl in engagement with its associated ratchet, preventing rotation thereof and therewith rotation of the slip clutch-operated screw 67. Magnets 82, 83, 84 are provided for respectively operating the stop levers 75, 76, 77 for the purpose of releasing the corresponding stop ratchets. The two stop levers, for example, the levers 75, 76, which are not required for operation, are attracted by their associated magnets 82, 83 and remain locked in their inoperative positions. The stop lever belonging to the screen to be applied, for example, lever 77 is in its normal position in stop engagement with the ratchet 71 during the operative engraving motion of the table, and the engraving carriage 68 accordingly cannot be advanced during the engraving along the corresponding line. The magnet 84 is momentarily energized during the return travel of the table to attract the stop lever 77 so as to free the ratchet 71 for the purpose of making the slip clutch effective to rotate the screw 67 for the purpose of advancing the engraving carriage 68 and therewith the arm 14 and the engraving tool carried thereby by one step.

The advance motion of the scanning device 48 and therewith of the scanning light beam 49 is effected in similar manner as the advance thereof in the scanning direction and is controlled by the advance motion of the engraving carriage 68 to which is pivotally journalled by a head 86 a slotted arm 85 which is rotatable about the shaft 87. The slotted arm 85 rotates responsive to the advance motion of the engraving carriage 68 relative to a fixed bolt 88 sliding within a slot 89. The arm 85 is provided with a second longer slot 90 formed therein into which projects a bolt 91. The latter extends from a head member 92 which is vertically adjustable relative to a U-shaped member 94 by a screw 93. A motor 95 is provided for driving the screw 93 through the medium of a gear 96 and pinions 97 for the purpose of positioning the bolt 91 with respect to the member 94. The block member 47 extending from member 94 is slidably disposed upon a bar 98. The part 51 connected with the member 47 by the rod 50 is provided with rollers 99 in engagement with a structural part 100 to facilitate displacement of the optical system carried by the member 48.

Stepwise advance motion of the engraving carriage 68 causes angular displacement of the swinging arm 85 about the bolt 91, thereby angularly moving the member 94 and therewith the scanning device 48 and the support 52 carrying the deflection mirror 55 similarly stepwise, the magnitude of the advance step depending upon the position of the bolt 91 in the slot 90, which can be continuously adjusted.

If the bolt 91 is disposed underneath the rotation axis 87, the displacement of the scanning device 48 will be smaller than that of the engraving carriage 68 and the image on the plate 3 will accordingly be enlarged as compared with the picture image. If the bolt 91 is coaxial with the rotation axis 87, the engraving carriage 68 and the scanning device 48 will execute steps of identical size and the reproduction proportion will be 1:1. Finally, if the bolt 91 is positioned above the rotation axis 87, the displacement of the scanning device 48 will be greater than that of the engraving carriage 68 and the image produced on the plate 3 will be a reduced version of the picture image.

The advance step of the scanning device depends upon the screen employed and also upon the desired reproduction scale and the corresponding data are considered in the adjustment of the bolt 91.

The machine is automatically stopped upon termination of the engraving operation, by a switch which is controlled by a stop carried by the engraving arm 14.

The described and illustrated apparatus represents an example of an embodiment. It is understood that the drive for the scanning and advance motions may be different from those shown.

For example, friction gear drives or suitable parallelogram guide means may be employed for the continuous variation of the reproduction scale in place of the swinging arm or lever means.

In case only a few predetermined reproduction scales are required, screw drives for the scanning and advance motions of the scanning device will suitably be used and the speeds thereof can be adjusted by transfer and change-over gears according to magnitude and direction of motion. Ball wedge locking means or ratchet drive means with resilient stop pawls may be used in known manner for controlling the advance of the engraving and scanning devices.

Changes may be made within the scope and spirit of the appended claims.

I claim:

1. In a machine for electromechanically producing printing plates, having a single substantially flat reciprocable table for supporting on one side thereof a picture to be reproduced and on the other side thereof a plate to be engraved line-for-line according to the contents of said picture, and having scanning means disposed relative to the side of said table on which is supported said picture for photoelectrically scanning such picture line-for-line and an engraving device controlled thereby and disposed relative to the side of said table on which is supported said plate for engraving said plate line-for-line in accordance with the photoelectrically scanned line-for-line contents of said picture, and having first drive means for reciprocating said table to effect said engraving during motion in one direction thereof and second drive means for advancing said engraving device and said scanning means at the end of engraving of each line in a direction perpendicular to the reciprocating motion of said table; a device for controlling said machine to provide for reproduction of said picture contents on said plate according to variable reproduction scale, said device comprising adjustable first control means for imparting to said scanning means auxiliary reciprocating motion relative to said engraving device which is effective in the direction of scanning thereof, the relative speed of said auxiliary motion corresponding to the desired reproduction scale, and second adjustable control means for governing the operation of said second drive means to impart to said engraving device a line advance motion corresponding to the screen employed and to impart to said scanning means a line advance motion corresponding to the screen employed and to the desired reproduction scale.

2. A structure and cooperation of parts according to claim 1, wherein said first adjustable control means comprises a substantially horizontally movable drive member, an elongated substantially vertically extending control member which is at one end thereof pivotally connected with said drive member and has a principal continuous slot formed therein which extends intermediate of its opposite ends, the free end of said control member being forked to form a terminal slot, a fixedly disposed bolt extending into said terminal slot and forming a pivot about which said control member will angularly move responsive to horizontal motion of said drive member, a vertically adjustable bolt cooperatively interconnected with said scanning device and extending through said principal slot for moving said scanning device responsive to angular movement of said control member, auxiliary drive means for said drive member, and clutch means for selectively coupling said drive member for drive motion with said first drive means and said auxiliary drive means, respectively.

3. A structure and cooperation of parts according to claim 1, wherein said second adjustable control means comprises an elongated substantially vertically extending control member which is at a point intermediate its opposite ends pivotally connected with said engraving device and has a principal continuous slot formed therein which extends intermediate its opposite ends, a terminal slot being formed in said control member at the lower end thereof, a fixedly disposed bolt extending into said terminal slot and forming a pivot about which said control member will angularly move responsive to line advance motion of said engraving device, a vertically adjustable bolt cooperatively connected with said scanning device and extending into said continuous slot for moving said scanning device responsive to angular displacement of said control member, and means for vertically adjusting the position of said adjustable bolt within said continuous slot relative to the pivot point thereof on said engraving device.

4. A structure and cooperation of parts according to claim 1, wherein each said first and said second adjustable control mans comprises a pivotally mounted angularly displaceable control member, means governed by said first drive means for controlling the angular displacement of the control member of said first control means, means for cooperatively coupling said scanning means with such control member to cause reciprocation of said scanning means responsive to angular displacement of said control member; means governed by said second drive means for controlling the angular displacement of the control member of said second control means, means for cooperatively coupling said scanning means with such control member to cause line-advance motion of said scanning means coincident with line-advance motion of said engraving device, and means for adjusting the angular stroke of displacement of said control members.

5. A structure and cooperation of parts according to claim 1, wherein said second adjustable control means comprises drive gear means, a drive member driven by said drive gear means, a plurality of ratchets coupled with said drive member, and selectively operable pawl means for controlling the operation of said ratchets, for governing the operative actuation of said drive member.

6. A machine for electromechanically reproducing printing plates from an original subject matter wherein the scale of the reproduction is different from that of the original, comprising a table for supporting in fixed relation the plate to be engraved and the subject matter to be reproduced thereon, scanning means disposed opposite the subject matter-supporting portion of said table, engraving means disposed opposite the plate-supporting portion of said table, means for effecting reciprocation between said table and the scanning and engraving means, means operatively connecting said scanning and engraving means for actuating the latter in accordance with the scanning of said scanning means, means for effecting relative movement between the scanning means and the engraving means in the direction of said reciprocation operative to produce an engraved line on a scale which is different from that of the original subject matter, means for effecting relative step by step movement between said table and said scanning and engraving means in a direction at right angles to said reciprocation to bring the table and the scanning and engraving means into respective positions for the following line of scanning and engraving, and means associated with said last mentioned means for effecting, at each step, relative movement between said scanning and engraving means in said last mentioned direction to space the following lines of scanning and engraving at scales appropriate to the respective scales of said scanning and engraving lines.

References Cited in the file of this patent

UNITED STATES PATENTS

| | | |
|---|---|---|
| 2,005,130 | Dalton | June 18, 1935 |
| 2,149,487 | Zilberman et al. | Mar. 7, 1939 |
| 2,415,450 | Swann | Feb. 11, 1947 |

FOREIGN PATENTS

| | | |
|---|---|---|
| 733,037 | Great Britain | July 6, 1955 |